April 30, 1963 — A. H. JACOB ET AL — 3,087,990

COMMUNICATION SYSTEM

Filed Dec. 30, 1959 — 2 Sheets-Sheet 1

INVENTORS
ALBERT H. JACOB
LEON GINSBERG

BY Samuel Kelowitz

ATTORNEY

April 30, 1963 A. H. JACOB ET AL 3,087,990

COMMUNICATION SYSTEM

Filed Dec. 30, 1959 2 Sheets-Sheet 2

INVENTORS
ALBERT H. JACOB
LEON GINSBERG

BY Samuel Lebowitz
ATTORNEY 3,087,990
Patented Apr. 30, 1963

3,087,990

COMMUNICATION SYSTEM

Albert H. Jacob and Leon Ginsberg, Toronto, Ontario, Canada, assignors of one-half to Radio Components Limited, Toronto, Ontario, Canada, a corporation of Ontario, Canada Filed Dec. 30, 1959, Ser. No. 862,906
17 Claims. (Cl. 179—2)

Figure 1:
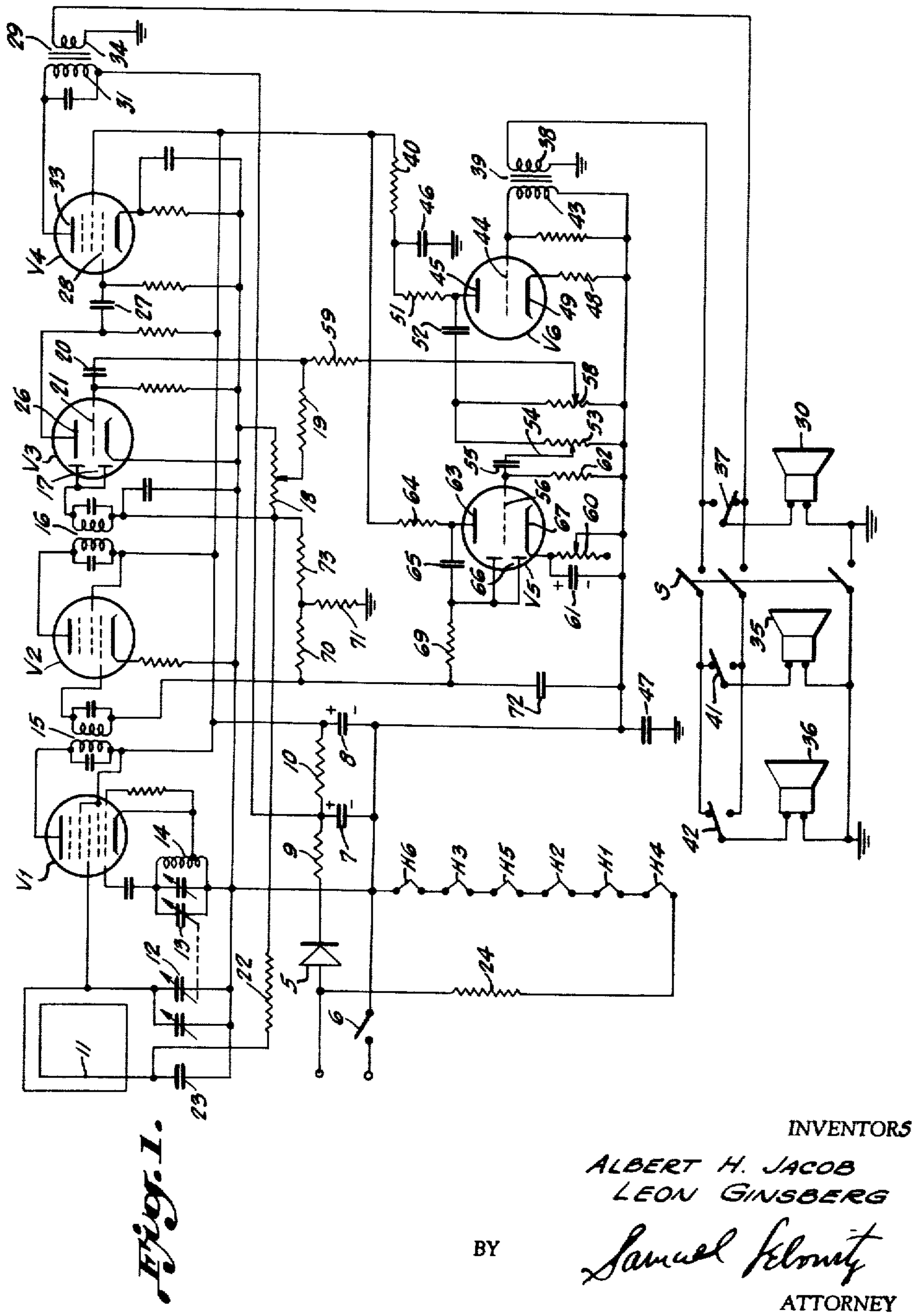

This invention relates in general to communication systems in which one signal, designated as a primary signal, is replaceable by another signal, designated as a secondary signal. The invention is applicable to an intercommunication system utilizing for the intercommunication function a portion of a conventional radio receiver or other apparatus normally receiving and delivering a radio or other signal.

A combined radio receiver intercommunication system using common apparatus for delivering both primary signals (e.g. a radio broadcast) and secondary signals (e.g. a local conversation) may have many applications. For instance, it may be desirable to have a monitor or alarm responsive to sounds originating at selected locations and providing a secondary signal at the locality of the radio receiver. Thus, a monitor in a nursery may provide a signal in a kitchen, or an alarm in an out-house may provide a signal in a shop, or a repeater for a telephone or door bell may provide a signal in a playroom. When the radio receiver is broadcasting a radio program at the place where the secondary signal is to be delivered, it is desirable to have the secondary signal interrupt the radio program (primary signal) and be heard in its place, rather than to have the primary and secondary signals occurring simultaneously. Also, for the convenience of persons following the program or broadcast, it is desirable that normal reception of the radio program be resumed after the secondary signal is completed.

The present invention provides an economical radio receiver intercommunication system capable of performing the functions set forth above and capable of still further applications. Thus, it may be used to provide a radio in a taxicab, the radio being interrupted automatically for the duration of incoming or outgoing despatching calls. Or a radio program may be interrupted by signals from a Geiger counter, or by signals from a receiver tuned to a frequency reserved for emergency signals. The invention is not, however, limited to radio receiver application, for it may be used for such purposes as cutting off a first microphone at one location on a stage, whence primary signals emanate, in favor of a second microphone at another location, whence secondary signals emanate; here both the primary signals and the secondary signals are audio signals.

The main object of the invention is to provide a method and apparatus whereby a fluctuating secondary signal which is not assisted by a carrier, can automatically interrupt a primary signal.

Another object of the invention is to provide a method and apparatus for delivering any kind of signal with priority over an existing function by interruption of said function for a period equal to the duration of said signal, or longer if desired.

Another object is to provide a new and improved wave signalling system which is applicable as an intercommunication system utilizing a portion of a conventional radio receiver for the translation of a secondary signal, the receiver being maintained operative for transmission of a radio program (primary signal) when the secondary signal is not present.

Another object of the invention is to provide a circuit arrangement enabling the secondary signal or call to interrupt the primary signal or radio program and to be substituted therefor automatically, without use of relays or switches or auxiliary control wiring from the sub-station where the secondary signal originates to the radio receiver or master station where it is delivered.

A more specific object is to provide a circuit having a minimum of components but providing good primary signal reception, together with high sensitivity to the interrupting or secondary signal.

Another specific object is to provide for an adjustable predetermined delay between the termination of an interrupting signal and the resumption of the normal program.

Another object is to safeguard against interruptions or control from signals of less than predetermined intensity or from those caused by spurious signals of very short duration.

Another object is to provide a method of variably controlling a primary signal in response to the strength of a secondary signal and in direct or indirect proportion to said secondary signal, the range of response being adjustable from a level at which a secondary signal will reduce translation of a primary signal to a level at which a secondary signal will completely block translation of a primary signal.

Control of the reproduceable level of the secondary signal is also achieved independently of the control of the blocking action and to a varying degree so that the secondary signal may completely replace the primary signal, be superimposed over the primary signal, or not be reproduced at all.

Another object is to provide an adapter with circuitry that permits same to be attached to an existing radio or television receiver, or an audio program amplifier, without need for modification of the existing equipment.

In a combined radio receiver intercommunication system embodying a preferred form of the invention the secondary signal is amplified and a portion thereof is rectified to produce a D.C. voltage which is applied as a negative bias to an electronic tube of the radio receiver in a stage of the receiver (such as the intermediate frequency stage) preceding the audio amplifier section of the receiver. The stage to which the negative bias is applied is one normally translating a modulated wave of the primary signal, but the negative bias developed by the secondary signal causes this stage to be blocked off. Another portion of the amplified secondary signal is normally applied to the input circuit of the audio amplifier section of the radio receiver and is translated therethrough in substitution for the primary signal or program. Thus, the audio amplifier section of the radio receiver is used for translating, alternatively, the primary signal or program, and the secondary signal or call. Preferably the master station, consisting of the radio receiver, and also the sub-stations, where the secondary signals originate, are provided with moving coil transducers which can serve as loudspeakers and also as microphones. By switching, any transducer may be connected into circuit as a microphone and upon picking up sound, such sound automatically interrupts the primary signal or program and is heard in its stead in all the other transducers connected into the system as loudspeakers. Upon the cessation of sound, the primary program is automatically resumed.

A feature of this embodiment of the invention is the provision, for the minimum secondary signal to which the system is required to respond, of a negative bias control voltage sufficiently large to assure positive and distortion-free blocking of the primary signal or program Electronic amplifier tubes ordinarily distort signals badly in the region of cut-off. The large negative bias control voltage provided in accordance with the invention causes the tube to pass with certainty through the critical region, thereby assuring positive silencing of the primary signal.

Another feature of the invention closely related to the provision of a large negative bias control voltage is the supplying of such voltage to a capacitor connected in circuit with a resistor for controlling the rate of discharge of the capacitor. By suitable choice of the size of the circuit elements, the time duration of the cut-off condition may be extended at will. This allows delaying the restoration of the normal operation of the radio receiver until some predetermined time interval after the cessation of the secondary signal. This action is desirable because it prevents the primary signal or program from instantly cutting in during momentary interruption in the secondary signal, for instance during a brief pause in a conversation which constitutes the secondary signal.

According to another feature of the invention, only that portion of the secondary signal which is to be translated by the audio amplifier section of the radio receiver is amplified linearly. That portion of the secondary signal which is to be subjected to rectification to provide the negative bias control voltage need not be amplified linearly. Accordingly, in selecting a suitable voltage amplifier and rectifier in respect of this latter portion, no consideration need be given to frequency response, distortion characteritsics or linear amplification. As a result, substantial economies in circuit components may be achieved, and yet a fluctuating secondary signal, which is free of any carrier-frequency energy, can with positiveness block the primary signal.

Figure 2:
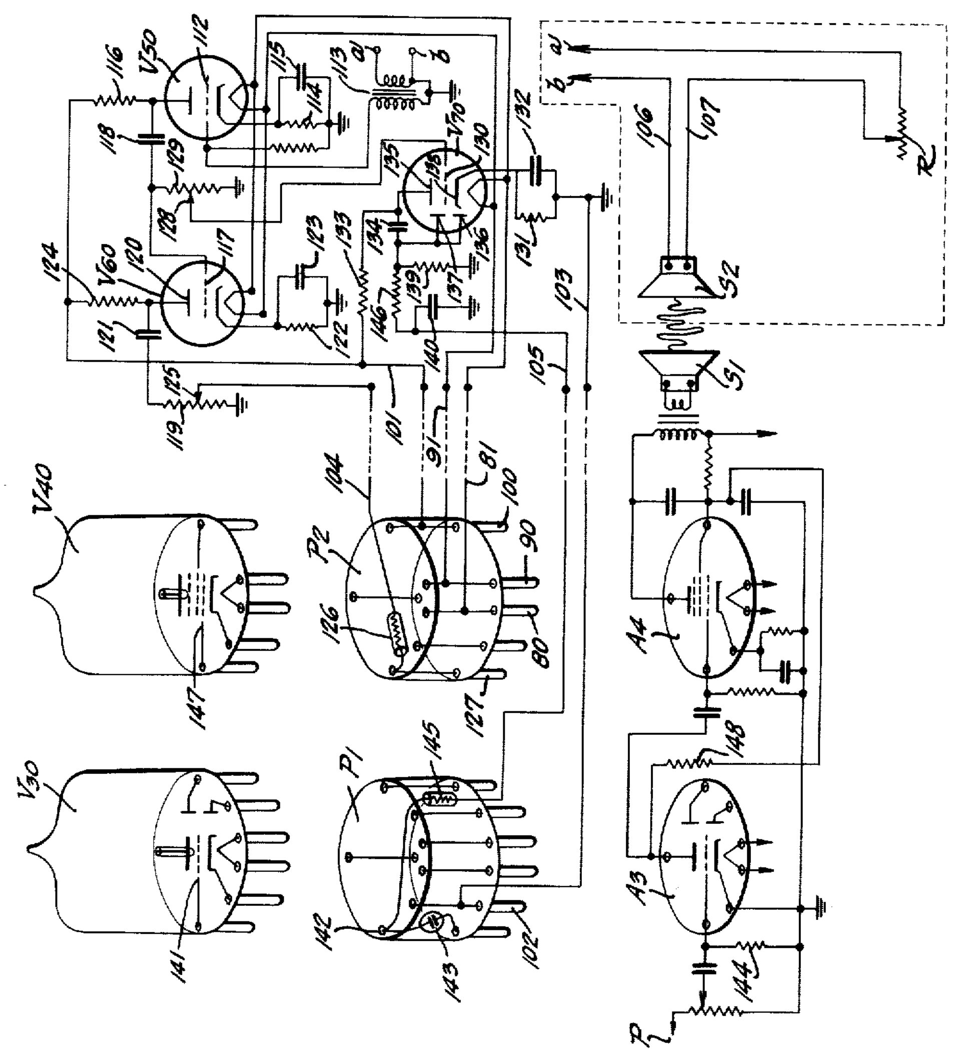

For further features and advantages of the invention, attention is now directed to the following description of preferred embodiments illustrated in the accompanying drawings, wherein FIG. 1 is a schematic circuit diagram of a combined radio receiver and intercommunication system constituting a preferred embodiment of the invention; and FIG. 2 is a circuit diagram of a different embodiment of the invention including an adapter assembly adapted to be applied to the audio stage of a radio or television receiver or music distribution system.

Referring to the drawings, the radio receiver shown in FIG. 1 is of conventional design and comprises four electronic tubes V1, V2, V3 and V4 and a rectifier 5. The receiver is energized from the usual 115 to 120 volt supply, A.C. or D.C., through an on-off switch 6. Rectifier 5 is connected in a half-wave circuit with a resistance-capacitance filter comprising electrolytic capacitors 7, 8 and resistors 9 and 10. Only the anode of the last audio amplifier, tube V4, is connected to the first filter capacitor 7; all other anodes and screen-grids are connected to second filter capacitor 8.

Vacuum tube V1 is a pentagrid converter which operates to change the frequency of the radio-frequency signal picked up by antenna loop 11, tuned by variable capacitors 12, 13 connected in parallel with inductance 14, capacitors 12 and 13 being ganged in the usual fashion.

Tube V2 is a pentode intermediate frequency amplifier. It receives its input signal from the anode of tube V1 through tuned transformer 15, and delivers its amplified output signal through tuned transformer 16 to anodes 17 of the diode section of tube V3.

The audio signal resulting from the demodulation of the intermediate frequency signal in the diode section of tube V3 is developed across potentiometer 18 which serves as a volume control for the primary signal or program. From the adjustable tap of the potentiometer, the signal is supplied through resistor 19 and coupling capacitor 20 to grid 21 of the triode section of tube V3 for amplification. The demodulated signal is also supplied through resistor 22, in series with antenna loop 11, to the signal grid of pentagrid converter tube V1 to provide automatic volume control (A.V.C.) through variation of negative grid bias. Resistor 22 and capacitor 23 are part of the usual A.V.C. time constant and filter circuit.

The amplified audio signal is coupled from anode 26 of tube V3 through capacitor 27 to control grid 28 of tube V4 which serves as the final or output audio amplifier and may be a beam power type tube. The audio output signal from tube V4 is delivered through output transformer 29 and switch 37 to loudspeaker 30.

To this end, primary winding 31 of transformer 29 is serially connected between anode 33 of tube V4 and filter capacitor 7, and secondary winding 34 of the transformer is connected across the loudspeaker 30 via a common ground connection.

As thus far described, the radio receiver illustrated in the drawing is in general conventional, and the invention is more specifically concerned with the part to follow.

The loudspeaker 30 of the receiver, and typical auxiliary loudspeakers 35 and 36 of the intercommunication system, are moving coil type transducers, preferably of the permanent magnet type. As is well known, such loudspeakers or transducers may function equally well as microphone or pick-up devices, the voice coil generating a voltage when the cone is actuated by a sound wave.

Transducer 30 is the loudspeaker normally incorporated in the radio receiver, and it is shown connected across secondary winding 34 of output transformer 29 through the lower contact of double throw switch 37. By throwing the switch to its upper contact, transducer 30 is connected across primary winding 38 of input transformer 39 and then serves as a microphone. Similarly, sub-station transducers 35 and 36, by manipulation of switches 41 and 42, may be connected across output transformer 29 to serve as loudspeakers, or across input transformer 39 to serve as microphones. In the drawing, the switches are shown connecting transducer 30 as a loudspeaker, and transducers 35 and 36 as microphones. It will be understood that if the transducers 35 and 36 are to be used solely as microphones, for interruption of the primary signal by the secondary signal, the switches 41 and 42 may be eliminated. While the most usual requirement is for transducers 35, 36 to be responsive to sound, transducers responsive to light, heat, electromagnetism, radioactivity or other radiation may usefully be employed, as may other signal sources. Switch S serves to plug in the sub-station transducers in circuit with the radio receiver to set the intercommunication system for operation.

The secondary signal or call generated by either transducer 35 or 36 is supplied, through secondary winding 43 of input transformer 39, to control grid 44 of triode amplifying tube V6. The input transformer is provided in order to match the relatively low impedance of the voice coil of the transducer to the relatively high input impedance of the grid circuit of vacuum tube V6 for efficient transfer of energy.

Tube V6 is required to operate as a linear amplifier, and for this purpose resistor 48 is provided in series with cathode 49 to create a suitable negative operating bias voltage for the grid relative to the cathode. The amplified secondary signal is developed from anode 45 across anode resistor 51 and is coupled by capacitor 52 to potentiometers 53 and 58, the signal across the potentiometers being a linearly amplified version of the original secondary signal or call.

An adjustable percentage (as determined by the setting of tap 54 on potentiometer 53) of the linearly amplified secondary signal is supplied through coupling capacitor 55 across grid resistor 62 to control grid 56 of triode amplifying tube section V5. Potentiometer 58 permits adjustment of the percentage of the signal which is supplied through series resistor 59 to the input circuit of first audio amplifier tube V3 in the radio receiver for translation to the loudspeaker, without appreciably affecting the percentage supplied to tube V5. Potentiometer 53 determines the minimum secondary signal to which the system will respond, whereas potentiometer 58 determines the intensity or loudness at which such secondary signal will be reproduced in the loudspeaker 30.

According to the invention, by reason of the fact that amplifying tube section V5 amplifies the secondary signal for the creation of a control bias and not for sound reproduction purposes, there is no need to have it operate as a linear amplifier.

This makes it possible to provide resistor 60 to adjust grid-to-cathode bias for this tube, which will result in a delayed action, whilst at the same time its distortion causing effect on the signal is quite acceptable. In order to cancel the resulting negative feedback effect on the amplification of the triode section, resistor 60 is bypassed by capacitor 61.

The amplified secondary signal output from anode 63 of tube V5 is developed across anode load resistor 64 and is coupled by capacitor 65 to anodes 66 which, in conjunction with cathode 67, constitute the diode section of tube V5. In general, the diode will conduct current to the cathode on the positive half cycles of the signal applied to the anode.

However, since the cathode is positively biased with respect to ground, the diode will not conduct until the signal has reached the selected cathode potential. Thus, when the signal exceeds the limit, rectification takes place while the full amplitudes of negative half cycles develop a voltage across resistors 69, 70, 71 to ground. This "threshold action," which is preferably made adjustable by adjustable resistor 60, is similar to a delayed A.V.C. circuit, wherein the signal must reach a predetermined level to be passed on or to be utilized in full strength. This feature reduces acoustic feedback and prevents extraneous, faint or momentary noises from exercising any blocking effect on the primary signal.

During signal fluctuations the voltage across resistors 70 and 71 permits capacitor 72 to build up and maintain a negative charge with respect to ground. This negative charge is applied to the signal grid of intermediate frequency amplifier tube V2 and serves to cut off that tube and block transmission of the primary signal or program through the radio receiver.

As previously discussed, it is desirable that the removal of the negative bias control voltage at tube V2 be delayed for a short time interval after the cessation of the secondary signal or call in order to prevent the primary program from immediately cutting in during a brief interruption, such as a conversational pause, in the secondary signal. The development of a more than adequate negative bias voltage provides ample leeway in this respect. The actual delay interval depends on the magnitude of the negative bias voltage and the time constant of the circuit comprising capacitor 72 and resistors 70 and 71, and is determined by suitable choice of the magnitude of these circuit elements.

In order to insure that the blocking off of intermediate frequency amplifier tube V2 through negative bias be rapid and positive, a tube with a sharp cut-off characteristic is preferably used. The amplification provided by the tube V5, the rapid build up of charge across the capacitor 72 and the sharp cut-off characteristic of the tube 2 ensure that the minimum secondary signal to which the system is required to respond causes the tube V2 to be biased well beyond cut-off so as to be free of the distortion that inherently occurs near cut-off. Peaks in the secondary signal maintain the bias voltage across capacitor 72. There is, therefore, no practical danger of distorting the function of the tube V2 as an intermediate frequency amplifier due to a change of its normal operating characteristic. When tube V2 is of a remote cut-off type the bias control will merely reduce amplification of the primary signal according to the level of the rectified secondary signal voltage, subject to the adjustment of resistor 60 controlling the predetermined minimum response.

It is also desirable to control the initial buildup of the charge across capacitor 72 so that strong nuisance signals of short duration will not be sufficient to bias the tube 2 to cut-off. Resistor 69 is accordingly chosen to provide a suitable time delay.

Resistors 71 and 73, forming a voltage divider, reduce the A.V.C. voltage applied to the intermediate frequency amplifier tube V2 via resistor 70 in order to distribute the A.V.C. voltage in proportion to the control characteristics of the tubes to which it is applied.

For the convenience of those desiring to practice the invention, a 12AU6 tube has been found suitable as the intermediate frequency amplifier V2. Suitable types for the other tubes shown in the drawing are a 12BE6 for tube V1, 12AV6 for tubes V3 and V5, 35C5 for tube V4, and a selenium or silicon rectifier 5. Triode tube V6 may be part of another 12AV6. Heaters H1–H6 of these tubes may be conveniently connected in series across a 115 volt supply, including a voltage reducing resistor 24.

While the transducers 30, 35 and 36 may be connected to act as loudspeakers and thus to deliver the output signal to different locations, when the transducers are connected in the manner shown in the drawing the transducers 35 and 36 act as microphones and sound picked up by these microphones is then broadcast through the speaker 30 by the electronic means described, without the need for switches, expensive relays, or auxiliary controls for operating such switches or relays from remote locations. Without affecting the efficiency of the radio, an automatic intercommunication system has been provided by the addition of only two tubes, V5 and V6. The intercommunication system makes use of the audio amplifier of the radio, and also provides additional amplification in tube V6 for intercommunication signals.

The apparatus as described represents the combination of a wave translation section serving the primary signal, a second wave translation section serving a secondary signal and a third translation section serving both primary and secondary signals. In practice, the three sections may be connected to form one single unit or be physically detached from each other. Likewise, the third signal translation section may physically be part of the second wave translation section. The second wave translation section may also include its own transducer to reproduce the secondary signal, independent of the primary signal transducer, while providing energy to interrupt primary signals at one or more remotely connected first wave translation sections, for example, in a multi-channel stereo amplifier system. Radio or television sets may thus be provided for the interruption of their signal translation without actually including most of the additional circuit components which constitute parts of this invention and which may be connected to the sets at a later date.

One example of subdividing the units as suggested above to attain a departure from a typical economical installation as disclosed in FIG. 1 may be found in the arrangement illustrated in FIG. 2. This embodiment is typical of a more elaborate or deluxe circuit of multiple audio stages where economy is not a prime factor, i.e., where the audio stages may be divided to attain desired operating advantages.

FIG. 2 illustrates an adapter assembly connected to a secondary signal source, which may be plugged into the audio amplifier stages of existing radio or television receivers or music distribution systems. Accordingly, the adapter circuit includes an extra audio amplifying stage to avoid adjustments to the original circuitry of existing equipment.

This adapter can be suitably applied to existing equipment not previously designed for this specific purpose. A non-technical person can connect this adapter because there is no need to modify the existing set to which the adapter is to be attached, to disrupt its wiring or to remove its chassis.

The final stages of the radio or television broadcast receiver or audio-amplifying system are shown at the bottom of FIG. 2. These are of conventional design as the audio frequency energy is led from point P for amplification through stages A3 and A4 for final reproduction through loudspeaker S1. The circuit elements indicated schematically within tubes A3 and A4 at the bottom of FIG. 2 have their counterparts in vacuum tubes V30 and V40, respectively, the prongs of which are normally inserted within apertured sockets as is conventional in the art. When the intercommunication system in accordance with the invention is applied to existing apparatus, plug adapters P1 and P2 are inserted into the respective tube sockets of stages A3 and A4. The plug adapters are designed to receive the respective tubes V30 and V40 and in addition have cable connections leading therefrom to the circuitry of the secondary signal as described below.

The heater supply for tubes V50, V60 and V70, included in the adapter circuit is connected from pins 80 and 90 of adapter plug P2 through conductors 81 and 91, respectively. The plate supply for the tubes V50, V60 and V70 is derived from pin 100 of plug P2 through conductor 101, and the B— or ground connection is made through pin 102 of adapter plug P1 through conductor 103.

The secondary signal, originating at a mircophone, phonograph pick-up or other transducer, may be connected to terminals *a, b,* and is applied to the grid 112 of tube V50 via input transformer 113, the latter being provided to match a low impedance line or transducer to the relatively high impedance of the grid circuit of tube V50. Suitable operating bias is obtained through cathode resistor 114, bypassed by capacitor 115; resistor 116 represents the anode load for tube V50. The amplified secondary signal is coupled to the grid 117 of tube V60 via capacitor 118. Tube V60 develops an amplified signal across potentiometer 119 coupled to the anode 120 through capacitor 121. Suitable operating bias is obtained through cathode resistor 122, bypassed by capacitor 123; resistor 124 represents the anode load for tube V60. The setting of tap 125 on potentiometer 119 determines the level of the secondary signal to be fed to the control grid 147 of the audio output tube V40 and to be reproduced in the existing equipment. To limit the controlling function of potentiometer 119 to the secondary signal only and to prevent short-circuiting of the input of tube V40, a resistor 126 is connected between tap 125 and pin terminal 127 in the conductor 104 therebetween.

A portion of the secondary signal, as determined by the setting of tap 128 on potentiometer 129, is applied to the grid 130 of tube V70 to be amplified thereby. The triode section of tube V70 is biased by cathode resistor 131, bypassed by capacitor 132; resistor 133 represents the anode load. Capacitor 134 couples the amplified signal output from anode 135 of tube V70 to anodes 136 and 137, which in conjunction with cathode 138 constitute the diode portion of tube V70. In general, the diode will conduct current during the positive half cycles of the applied signal. However, since the cathode 138 is positively biased with respect to ground, the diode will not conduct until the signal has reached the fixed bias potential or threshold limit. Only when the signal exceeds that potential will rectification take place. A negative voltage developing across load resistor 139 will build up a charge in capacitor 140. During signal fluctuations this capacitor will maintain an average negative potential which is applied to the control grid 141 of tube V30 via socket terminal 142 through conductor 105, which includes a resistor 145 therein.

When tube V30 is normally conductive, its relatively low internal resistance in relation to resistor 126 will greatly reduce the secondary signal as applied to the grid 147 of tube V40. After tube V30 has been biased beyond cutoff, its internal resistance will increase to near infinity, thereby allowing most of the available secondary signal to reach the grid 147 in place of the primary signal. Obviously, anode resistor 148 should be as high as practical to minimize its shunting effect upon the secondary signal. Likewise, a tube with a suitably low internal resistance, when conducting, should be selected. For example, a tube with an internal resistance of 10,000 ohms is suitable. In this respect, the audio circuit of the television set should make allowance for the attachment of the auxiliary circuit so that the condition described may be utilized to the fullest extent.

Capacitor 143 serves to isolate the original grid leak resistor 144 from the adapter circuitry; the latter is replaced by the series of resistors 139, 146 and 145. Since the adapter is designed to produce a substantial negative voltage derived from a relatively weak secondary signal source, this negative voltage will adequately bias tube V30 beyond cutoff, thus effectively blocking translation of the primary signal.

The cable between adapter plugs P1 and P2 and the portable unit of the secondary signal contains conductors 81, 91, 101, 103, 104 and 105, indicated in dotted lines in FIG. 2. This cable may interconnect the components between remotely located stations. However, the adapter circuit is primarily designed to be attached to the main receiver unit, while the transducer-microphone may be remotely located and connected to terminals *a—b*.

In addition to the simple control of the primary signal normally produced by loudspeaker S1 which may be silenced by a transducer connected to terminals *a—b*, FIG. 2 shows an alternate arrangement by combining therewith the portion of the circuit enclosed within dotted lines. In this instance, a microphone or loudspeaker S2 is placed within the audible range of the loudspeaker S1 which reproduces the primary signal. The sound picked up by the transducer S2 is fed by conductor 106 and 107 to terminals *a—b* of the secondary signal circuit. A switch or rheostat R in the connecting lead 107 serves to control the degree of volume suppression. This arrangement makes possible the regulation of the volume of the primary signal in response to a secondary signal or the acoustic feedback of the primary signal, which results in a self-defeating action causing the primary signal to be blocked completely or to be variably suppressed. Since the line is usually at low impedance, lead "*a*" may be looped over a distance of several hundred feet, thus permitting remote control of the primary signal.

The arrangement illustrated in FIG. 2 lends itself to further modification and adaptation to meet special needs. For example, the television receiver of which FIG. 2 is the terminal end may be provided with a regular octal tube socket on the rear of the chassis. This socket would carry a dummy octal plug with certain jumper connections. In order to attach the blocking adapter, one would merely remove the dummy plug and replace same with a similar plug which forms part of the adapter. It is possible to design the adapter to fit snugly against the socket and flush with the side of the cabinet. In this manner the controls are easily accessible and appearance will not distract from the cabinet.

Provision of an octal base would also permit the internal speaker of the radio or television receiver to be used as a microphone to return a call to the attached substation. For this purpose a simple lever switch may be added to the blocking adapter which will reverse the input and output connections. This switch may be combined with either the volume or sensitively control to give a choice of several fixed positions rather than a continuously variable setting with a potentiometer type of control.

Since the audio section of the adapter constitutes a high gain amplifier, it may serve as a phono-amplifier with the added feature of automatically silencing the radio or television sound when in use. For this purpose an extra phono input jack must be added to the blocking adapter unit.

Another possible application for this adapter is as an amplifier of telephone conversations when connected to an induction coil, or simultaneous silencing of the television or radio receiver or Hi-Fi music reproducer in response to the ringing and use of a telephone. This method would distinguish between silencing effects produced by electro-acoustic devices responding to all environmental sounds and for the specific purpose while the telephone is in use.

As described above, locating the microphone or loudspeaker in the vicinity of the television or radio receiver will create a semi-remote automatic volume control, sensitive to the placement of the microphone in relation to the reproducer-loudspeaker of the television or radio set or any external Hi-Fi speaker. When the microphone is left in a position which would normally reduce the volume to a desired minimum, a switch or rheostat in the connecting lead would control such action at will. This means that radio, television or Hi-Fi sound may be remotely controlled by a number of inexpensive devices from any point along the low-impedance lead connecting the microphone with the adapter. A 45 ohm input lead may be looped effectively over several hundred feet.

While specific embodiments of the invention have been illustrated and described in detail, it is to be understood that these embodiments are intended as illustrative examples and the invention is not limited to the embodiments illustrated. Modifications in circuitry for adapating the invention to other wave signalling systems or sound receiver circuits will readily occur to those skilled in the art, and it will also be understood that the invention is equally applicable with minor changes to the sound or audio section of television receivers. In the specific system illustrated many modifications may obviously be made, as for example the elimination of the tube V6 in FIG. 1 for strong secondary signals, or the replacement of tubes by transistor type of amplifiers. The appended claims are, therefore, intended to cover any such modifications falling within the true spirit and scope of the invention.

In some of the appended claims it is convenient to use the general term "signal translation section" to refer to the loudspeaker 30 in FIG. 1 and the audio frequency stage, including tubes V3 and V4, of the radio receiver, or to the corresponding output section of other apparatus used to provide primary and secondary signals in accordance with the invention. Similarly it is convenient to use the term "first wave translation section" in referring to that portion of the apparatus that feeds the primary signal to the "signal translation section"; thus, in the radio receiver illustrated in FIG. 1, the antenna 11 and the radio frequency, intermediate frequency and detector stages, including the tubes V1 and V2 and the diode section of tube V3, constitute the "modulated wave translation section" or "first wave translation section." The term "auxiliary wave translation section" or "second wave translation section" is used to denote the portion of the apparatus that provides the means for the interruption of the primary signal and feeds the secondary signal to the "audio signal translation section" or "signal translation section," and in the system illustrated in FIG. 1 the "second wave translation section" includes the microphones 35 and 36, amplifier tubes V6 and V5, rectifier 66, capacitor 72 and other components enabling the secondary signal to be fed to the audio frequency stage of the radio and to cut off the intermediate frequency stage. The expression "tube" will be understood to include a tube section. The expression "randomly fluctuating carrier-free secondary signal" includes, for example, the signal derived from the sound of a human voice, music, the ring of a bell, radiation, or other signals that are intermittent or of variable amplitude or strength and are not supported by a higher frequency carrier that tends to ensure continuous reception of secondary energy during the whole of the period that the primary signal is to be interrupted.

This application is a continuation-in-part of our application Serial No. 535,881, filed September 22, 1955.

We claim:

1. A wave signalling system comprising a first wave translation section responsive to a primary signal and subject to cut-off and consequent blocking by means of bias voltage whereby the primary signal is blocked; a signal translation section having an input connected to the first wave translation section; a second wave translation section responsive to a randomly fluctuating carrier-free secondary signal and including means for supplying a portion of the secondary signal to the signal translation section, the second wave translation section also including an amplifier capable of amplifying another portion of the secondary signal to a strength greater than that of the portion supplied to the signal translation section, means for rectifying said other portion of the secondary signal to produce a control voltage, and means for supplying the control voltage as a bias to the first wave translation section to block the primary signal, the amplifier and rectifying means being of such proportions to provide, for the minimum secondary signal to which the system is required to respond, a bias control voltage at least as great as the minimum cut-off voltage of the first wave translation section.

2. A wave signalling system comprising a first wave translation section responsive to a primary signal and including at least one electronic tube subject to cut-off and consequent blocking by means of negative bias voltage whereby the primary signal is blocked; a signal translation section having an input connected to the first wave translation section; a second wave translation section responsive to a randomly fluctuating carrier-free secondary signal and including for the secondary signal a linear amplifier and a higher gain non-linear amplifier, means for supplying a linearly amplified and consequently substantially undistorted portion of the secondary signal from the linear amplifier to the signal translation section, means for rectifying a more amplified portion of the secondary signal from the non-linear amplifier to produce a negative control voltage, and means for supplying the control voltage as a negative bias to said electronic tube of the first wave translation section to block the primary signal, the non-linear amplifier and rectifying means being of such proportions to provide, for the minimum secondary signal to which the system is required to respond, a negative bias control voltage at least as great as the minimum cut-off voltage of the electronic tube of the first wave translation section.

3. A wave signalling system as claimed in claim 2, wherein said electronic tube is an amplifier having a sharp cut-off characteristic whereby it is subject to positive blocking by means of negative grid bias exceeding its minimum cut-off voltage.

4. A wave signalling system comprising a first wave translation section responsive to a primary signal and including at least one electronic tube subject to cut-off and consequent blocking by means of negative bias voltage whereby the primary signal is blocked; a signal translation section having an input connected to said first wave translation section; a second wave translation section responsive to a randomly fluctuating carrier-free secondary signal and including means for supplying a substantially undistorted portion of the secondary signal to the signal translation section, the second wave translation section also including a non-linear amplifier capable of amplifying another portion of the secondary signal to a strength greater than that of the portion supplied to the signal translation section, means for rectifying the non-linearly amplified portion of the secondary signal from the non-linear amplifier to produce a negative control voltage, the second wave translation section also including a charging capacitance and a discharging resistance for supplying the control voltage as a negative bias to the electronic tube of the first wave translation section to cut off the tube and thus block the primary signal, the non-linear amplifier, rectifying means, capacitance and resistance being of such proportions that, for all secondary signals to which the system is required to respond, the negative bias control voltage is at least as great as the minimum cut-off voltage of the electronic tube section, the charging and discharging also being proportioned for a predetermined time constant in order to delay the tube cut-off for a predetermined time interval after commencement of the secondary signal and to maintain the tube cut-off for a predetermined time interval after cessation of the secondary signal.

5. An intercommunication system comprising a radio receiver adapted to receive and translate a primary radio signal and including a stage subject to blocking by negative control voltage, an audio amplifying stage following the first mentioned stage, and a loudspeaker following the audio amplifier stage; a microphone responsive to a randomly fluctuating carrier-free secondary audio signal, a linear amplifier for amplifying the secondary signal and supplying a portion thereof substantially undistorted to said audio amplifying stage, a non-linear amplifier capable of amplifying another portion of the secondary signal without regard to distortion to a strength greater than that of the substantially undistorted portion, a rectifier for receiving said non-linearly amplified portion to produce a negative control voltage, and means for supplying said control voltage as a negative bias to the first mentioned stage to block off translation of the primary signal therethrough.

6. An intercommunication system comprising a program source for receiving a primary signal and including a wave translation stage having an electronic tube, an audio amplifying stage normally driven from said wave translation stage, a plurality of sound transducers, switching means connecting the transducers to the audio amplifying stage to serve as loudspeakers and also enabling the transducers to be connected as microphones, said microphones being responsive to a fluctuating carrier-free secondary signal, means for supplying a portion of the secondary signal substantially undistorted to the audio amplifying stage, a non-linear amplifier for amplifying another portion of the secondary signal without regard to distortion, a rectifier for receiving the non-linearly amplified portion to produce a negative control voltage, and charging means for supplying said control voltage as a negative bias to said electronic tube of said wave translation stage to block off translation of the primary signal therethrough, the non-linear amplifier, rectifier and charging means being constructed and arranged to produce, for all secondary signals to which the system is required to respond, a negative bias control voltage at least as great as the minimum cut-off voltage of said electronic tube.

7. An intercommunication system responsive to a broadcast program and to a randomly fluctuating carrier-free intercommunication signal, comprising a radio receiver adapted to receive the broadcast program and including an intermediate frequency stage incorporating an electronic amplifying tube having a sharp cut-off characteristic, an audio amplifying stage normally driven from the intermediate frequency stage, an output transformer driven from the audio amplifying stage, and a sound transducer driven from the output transformer; a microphone for receiving the intercommunication signal, an input transformer for supplying the intercommunication signal to a first resistance-capacitance coupled amplifier, the amplifier including an amplifying tube having a cathode loading resistor to provide grid to cathode operating bias for achieving linear amplification of the intercommunication signal, means for supplying a portion of the linearly amplified intercommunication signal to the audio amplifying stage, a second resistance-capacitance coupled amplifier having a non-linear amplifying characteristic, and means for supplying a portion of the linearly amplified intercommunication signal to the second amplifier for high amplification thereby, means for rectifying the signal output of said second amplifier to produce a negative control voltage, and means including a charging capacitance and a discharging resistance for supplying the control voltage as a negative bias to the electronic amplifying tube of the intermediate frequency stage to block off transmission of the broadcast program through the intermediate frequency stage, the second amplifier, capacitance and resistance being arranged and proportioned to provide, for all intercommunication signals to which the system is required to respond, a negative bias at least as great as the minimum cut-off voltage of the electronic amplifying tube of the intermediate frequency stage, the charging capacitance and discharging resistance being proportioned for a predetermined time constant in order to maintain the intermediate stage blocked off for a predetermined time interval after cessation of the intercommunication signal.

8. In the combination of a communication system with a modulated wave translation section adapted to receive and translate a primary radio signal and subject to blocking by means of grid bias and an audio signal translation section coupled to said wave translation section and including an output transducer, an auxiliary wave translation section including a transducer responsive to a randomly fluctuating carrier-free secondary signal, means for supplying a portion of the secondary signal to the audio signal translation section, means capable of amplifying another portion of the secondary signal independently of the first-mentioned portion, and means for rectifying and supplying said other portion as a bias to said modulated wave translation section to prevent translation of the primary signal through said modulated wave translation section.

9. In the combination of a communication system with a wave translation section and an audio signal translation section coupled thereto and composed of a plurality of amplifying stages adapted to receive and translate a primary signal, an output transducer connected to the output of said audio signal translation section, an auxiliary wave translation section including a transducer responsive to a randomly fluctuating carrier-free secondary signal, means for supplying a portion of the secondary signal to one of the amplifying stages of said audio signal translating section, means capable of amplifying another portion of the secondary signal independently of the first-mentioned portion, and means for rectifying and supplying said other portion as a bias to one of said amplifying stages preceding said last-mentioned one of the audio signal translating section to prevent translation of the primary signal therethrough.

10. An intercommunication system comprising a program source for receiving a primary signal and including a wave translation stage followed by an audio amplifying stage normally driven from said wave translation stage and having a plurality of successively connected electronic tubes, a loudspeaker connected to the output of said audio amplifying stage, a microphone for receiving locally a fluctuating audio-frequency secondary signal, means for supplying a portion of the secondary signal substantially undistorted to one of the electronic tubes of said audio amplifying stage, a non-linear amplifier for amplifying another portion of the secondary signal without regard to distortion, a rectifier for receiving the non-linearly amplified portion to produce a negative control voltage, and charging means for supplying said control voltage as a negative bias to one of said electronic tubes preceding said last-mentioned electronic tube to block off translation of the primary signal therethrough, the non-linear amplifier, rectifier and charging means being constructed and arranged to produce, for all secondary signals to which the system is required to respond, a negative bias control voltage at least as great as the minimum cut-off voltage of said second one of said electronic tubes.

11. In the combination of a communication system having an audio signal translation section comprising a plurality of amplifying stages adapted to receive and translate a primary signal, an output transducer connected to the output of said audio signal translation section, an auxiliary wave translation section including a transducer for reclining a randomly fluctuating carrier-free secondary signal, means for supplying a portion of the secondary signal to one of the amplifying stages of said audio signal translating section, means capable of amplifying another portion of the secondary signal independently of said first-mentioned portion, and means for rectifying and supplying said other portion as a bias to one of said amplifying stages preceding said last-mentioned one of the audio signal translating section to block translation of the primary signal therethrough.

12. An apparatus as set forth in claim 11, including a threshold limit for said last-mentioned rectifying means to control the incidence of the blocking action on the primary signal.

13. An apparatus as set forth in claim 11 wherein said one amplifying stage to which the blocking bias is applied functions as a ballast resistance prior to cut-off to reduce greatly the secondary signal applied to the first-mentioned one of the amplifying stages until cut-off of the preceding stage is effected, whereby low level spurious signals, interference or noise emanating at the secondary signal transducer are shunted from said output transducer.

14. An apparatus as set forth in claim 11 including means for adjusting independently the portions of the secondary signal transmitted from said auxiliary wave translation section to control the minimum level of the secondary signal which is operative upon the respective amplifying stages.

15. A detachable portable unit terminating in an adapter assembly for selective connection to a broadcast receiver having a modulated wave translation section and an audio signal translation section coupled thereto and composed of a plurality of amplifying stages adapted to receive and translate a primary signal, an output transducer connected to the output of said audio signal translation section and forming part of said broadcast receiver, said portable unit comprising an auxiliary wave translation section including a transducer for receiving a locally generated sustained secondary signal, means for supplying through said adapter assembly a portion of the secondary signal to one of the amplifying stages of said audio signal translating section for transmission to said output transducer, means in said portable unit for amplifying another portion of the secondary signal independently of said first-mentioned portion, and means for rectifying and supplying through said adapter assembly said other portion as a bias to one of said amplifying stages preceding said last-mentioned one of the audio signal translating section to prevent translation of the primary signal therethrough.

16. A detachable portable unit terminating in an adapter assembly for selective connection to a program receiver having an audio signal translation section comprising a plurality of amplifying stages adapted to receive and translate a primary signal, an output transducer connected to the output of said audio signal translation section, said portable unit comprising an auxiliary wave translation section, a transducer for receiving a locally generated sustained secondary signal, means for supplying through said adapter assembly a portion of the secondary signal to one of the amplifying stages of the audio signal translating section proximate to said output transducer for transmission thereto, means in said portable unit for amplifying another portion of the secondary signal independently of said first-mentioned portion, and means for rectifying and supplying through said adapter assembly said other portion as a bias to one of said amplifying stages preceding said last-mentioned one of the audio signal translating section to block translation of the primary signal therethrough, said preceding amplifier stage being of relatively low internal resistance in its conductive state prior to cut-off to enhance the discriminative effect exercised thereby on low level secondary signals to effect a shunting thereof from said output transducer while the primary signal is passing therethrough.

17. A detachable portable unit terminating in an adapter assembly for selective connection to a broadcast receiver for receiving a primary signal and including a wave translation stage followed by an audio amplifying stage normally driven from said wave translation stage and having a plurality of successively connected electronic tubes, a loudspeaker connected to the output of said audio amplifying stage and forming part of said broadcast receiver, a transmitter connected to said portable unit for receiving a locally generated sustained secondary signal, means for supplying through said adapter assembly a portion of the secondary signal substantially undistorted to one of the electronic tubes of said audio amplifying stage, a non-linear amplifier for amplifying another portion of the secondary signal without regard to distortion, a rectifier in said portable unit for receiving the non-linearly amplified portion to produce a negative control voltage, and charging means for supplying through said adapter assembly said control voltage as a negative bias to one of said electronic tubes preceding said last-mentioned electronic tube to block off translation of the primary signal therethrough, the non-linear amplifier, rectifier and charging means being constructed and arranged to produce, for all secondary signals to which the system is required to respond, a negative bias control voltage at least as great as the minimum cut-off voltage of said second one of said electronic tubes.

No references cited.

UNITED STATES PATENT OFFICE

CERTIFICATE OF CORRECTION

Patent No. 3,087,990 April 30, 1963

Albert H. Jacob et al.

It is hereby certified that error appears in the above numbered patent requiring correction and that the said Letters Patent should read as corrected below.

Column 13, line 11, for "reclining" read -- receiving --.

Signed and sealed this 10th day of December 1963.

(SEAL)
Attest:
ERNEST W. SWIDER

Attesting Officer

EDWIN L. REYNOLDS

Acting Commissioner of Patents